US011170091B2

(12) United States Patent
Gu et al.

(10) Patent No.: US 11,170,091 B2
(45) Date of Patent: Nov. 9, 2021

(54) METHOD AND APPARATUS FOR PROVIDING AND OBTAINING SECURE IDENTITY INFORMATION

(71) Applicant: Advanced New Technologies Co., Ltd., Grand Cayman (KY)

(72) Inventors: Chen Gu, Hangzhou (CN); Hongwei Luo, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 17/158,658

(22) Filed: Jan. 26, 2021

(65) Prior Publication Data

US 2021/0150011 A1    May 20, 2021

Related U.S. Application Data

(63) Continuation of application No. PCT/CN2019/110163, filed on Oct. 9, 2019.

(30) Foreign Application Priority Data

Nov. 16, 2018  (CN) .......................... 201811365449.2

(51) Int. Cl.
*G06F 21/32* (2013.01)
*G06F 21/62* (2013.01)
(Continued)

(52) U.S. Cl.
CPC ............ *G06F 21/32* (2013.01); *G06F 21/602* (2013.01); *G06F 21/6209* (2013.01); *G06K 19/06037* (2013.01)

(58) Field of Classification Search
CPC .... G06F 21/32; G06F 21/6209; G06F 21/602; G06K 19/06037
See application file for complete search history.

(56) References Cited

U.S. PATENT DOCUMENTS 6,668,276 B1 *  12/2003  Ohkado ................. G06Q 10/10
                                                    709/217
8,136,148 B1 *   3/2012  Chayanam ............. G06F 21/31
                                                    726/5

(Continued)

*Primary Examiner* — Shanto Abedin
(74) *Attorney, Agent, or Firm* — Shun Yao; Park, Vaughan, Fleming & Dowler LLP

(57) ABSTRACT

One embodiment provides a system and method for providing secure identity information. During operation, the system scans a graphic code associated with the service provider to obtain coded information; queries a registration platform based on the coded information to obtain an identifier of the service provider, an encryption key of the service provider, and a user-identity-information requirement associated with the service provider; obtains identity information of the user; obtains verified identity information from a verification source based on the identity information of the user; generates secure identity information for the user by encrypting, using the encryption key, at least the verified identity information, the secure identify information comprising the identifier of the service provider; and sends the secure identity information to the registration platform, thereby allowing the registration platform to forward the encrypted verified identity information to the service provider.

19 Claims, 7 Drawing Sheets

(51) Int. Cl.
*G06F 21/60* (2013.01)
*G06K 19/06* (2006.01)

(56) References Cited

U.S. PATENT DOCUMENTS

| | | | |
|---|---|---|---|
| 10,237,256 B1* | 3/2019 | Pena | H04L 63/0853 |
| 10,255,419 B1* | 4/2019 | Kragh | H04L 63/0823 |
| 10,742,634 B1* | 8/2020 | Shahbazi | G06K 7/10821 |
| 2005/0010547 A1* | 1/2005 | Carinci | H04L 63/08 |
| 2013/0219479 A1* | 8/2013 | DeSoto | G06Q 20/3276 |
| | | | 726/6 |
| 2013/0262857 A1* | 10/2013 | Neuman | H04L 63/18 |
| | | | 713/155 |
| 2014/0337634 A1* | 11/2014 | Starner | G06F 21/32 |
| | | | 713/186 |

* cited by examiner

METHOD AND APPARATUS FOR PROVIDING AND OBTAINING SECURE IDENTITY INFORMATION

RELATED APPLICATION

Under 35 U.S.C. § 120 and § 365(c), this application is a continuation of PCT Application No. PCT/CN2019/110163, entitled "METHOD AND APPARATUS FOR PROVIDING AND OBTAINING SECURE IDENTITY INFORMATION," by inventors Chen Gu and Hongwei Luo, filed 9 Oct. 2019, which claims priority to Chinese Patent Application No. 201811365449.2, filed on 16 Nov. 2018.

TECHNICAL FIELD

One or more embodiments of the present specification relate to the field of secure authentication of identity, and relate, in particular, to a method and an apparatus for providing and obtaining secure identity information.

BACKGROUND

In various offline application scenarios, conventional identity verification for a user is usually implemented based on an identity document, i.e., following the logic of "verifying the authenticity of a person's identity by an identity document." In a specific implementation, a natural person provides an identity document (such as an identity card, a passport, etc.), and a natural person representing a scenario merchant (such as a front desk staff of a hotel and a window clerk in an administrative service hall) confirms a corresponding relationship between the user and the identity document through visual inspection, and confirms the authenticity of the identity document through visual inspection or with the assistance of a card reader. On this basis, the required verification information is obtained from the identity document and may be considered as trusted identity information, and services are then provided according to the service logic of the scenario merchant.

However, with the continuous enhancement of user privacy protection (such as the minimum viable principle) and the increasingly high requirements of users for convenience, the above conventional offline verification method for user identity is currently facing increasingly more challenges, and cannot meet requirements in many scenarios. For example:

- a user may not carry his/her identity card;
- in some low-level offline application scenarios, a user is unwilling to hand over a core document such as an identity card to others for verification or even keeping a copy; and
- a service itself needs only a part of user information, not all key element information in the identity card.

With the continuous development of online commercialization and the popularization of real-name/real-person/real-identity document and other authentication methods in cyberspace, digitization of identity documents has become a future trend. However, identity verification based on the digitization of identity documents also faces security threats. For example, a photo of the electronic version of an identity card may be photoshopped (an attack against the real-name verification), face verification may be compromised (an attack against the real-name and real-person verifications), and the like. A trusted verification source is thus required to provide identity verification services, for example, the identity document database of the Ministry of Public Security, the population database, and the like.

Therefore, it is expected to have an improved solution to implement identity verification more safely and conveniently.

SUMMARY

One or more embodiments of the present specification describe a method and an apparatus for providing and obtaining secure identity information. Through such method and apparatus, a user can use a trusted application offline to safely and conveniently providing verified secure identity information to the service provider, by scanning a two-dimensional code displayed by a service provider.

According to a first aspect, one embodiment provides a system and method for providing secure identity information of a user to a service provider. During operation, a terminal device associated with the user scans a graphic code associated with the service provider to obtain coded information included in the graphic code. The system queries a registration platform based on the coded information to obtain an identifier of the service provider, an encryption key associated with the service provider, and a user-identity-information requirement associated with the service provider; obtains identity information of the user; obtains verified identity information of the user from a verification source based on the identity information of the user; generates secure identity information for the user by encrypting, using the encryption key, at least the verified identity information of the user, the secure identify information comprising the identifier of the service provider; and sends the secure identity information to the registration platform, thereby allowing the registration platform to forward the encrypted verified identity information of the user to the service provider.

In a variation on this embodiment, the graphic code is generated by the registration platform for the service provider in advance.

In a variation on this embodiment, obtaining the identity information of the user comprises one or more of: collecting face information using a camera associated with the terminal device, reading identity card information using a near-field communication (NFC) reader associated with the terminal device, and receiving input information from the user.

In a variation on this embodiment, the system determines the verification source and a required verification mode based on the user-identity-information requirement associated with the service provider.

In a further variation, determining the requirement verification mode comprises: in response to determining that the obtained identity information of the user meets the user-identity-information requirement, determining that the required verification mode is an authentication mode, in which the verification source is configured to return a notification indicating whether the identity information of the user is verified.

In a further variation, determining the requirement verification mode comprises: in response to determining that the obtained identity information of the user partially meets the user-identity-information requirement, determining that the required verification mode is an information mode, in which the verification source is configured to return a notification indicating whether the identity information of the user is verified and supplementary identity information of the user determined based on the verified identity information of the user.

In a further variation, generating the secure identity information for the user further comprises encrypting, using the encryption key, the verified identity information of the user and the supplementary identity information of the user.

In a variation on this embodiment, determining the verification source comprises determining that the verification source comprises a first verification source and a second verification source. The system sends a first part of the identity information of the user to the first verification source and sends a second part of the identity information of the user to the second verification source; receives a first verification result from the first verification source, and receives a second verification result from the second verification source; and combines the first verification result and the second verification result to obtain a combined verification result.

According to the second aspect, a method for providing secure identity information is provided, wherein the method is performed by a trusted application server, comprising:

obtaining two-dimensional code information corresponding to a two-dimensional code scanned by a user, wherein the two-dimensional code is generated by a registration platform in advance for a first service provider;

sending a query request to the registration platform, wherein the query request comprises the two-dimensional code information;

receiving a query result from the registration platform, wherein the query result comprises identification information of the first service provider, a public key of the first service provider, and first identity information required by the first service provider;

obtaining second identity information of the user;

sending the second identity information of the user to a verification source to obtain a verification result;

generating secure identity information, wherein the secure identity information comprises the identification information of the first service provider and encrypted information, the encrypted information is obtained by encrypting the verified first identity information by using the public key of the first service provider, and the verified first identity information is determined based on the second identity information and the verification result; and sending the secure identity information to the registration platform, such that the registration platform sends the encrypted information to the first service provider.

According to one implementation manner, obtaining the second identity information of the user comprises collecting the second identity information through a terminal where a client of the trusted application is located.

Further, in a specific embodiment, collecting the second identity information may comprise one or more of the following:

collecting face information through a camera on the terminal; and reading identity card information through an NFC function of the terminal and controls thereon.

According to another implementation manner, obtaining the second identity information of the user comprises receiving input information of the user through the client of the trusted application.

In a possible design, the above method further comprises determining the verification source and a required verification mode according to the required first identity information and the obtained second identity information.

Further, in one embodiment, the obtained second identity information comprises the required first identity information; in this case, determining the verification source and the required verification mode comprises determining that the required verification mode is an authentication mode, and in the authentication mode, the verification result is a notification result of whether the verification is successful.

In another embodiment, the obtained second identity information is a part of the required first identity information; in this case, determining the verification source and the required verification mode comprises determining that the required verification mode is an information mode, and in the information mode, the verification result comprises a notification of whether the verification is successful, and supplementary identity information determined based on at least a part of the successfully verified second identity information.

According to one embodiment, it is determined that the required verification source comprises a first verification source and a second verification source; in this case, sending the second identity information of the user to the verification source to obtain a verification result specifically comprises:

sending a first part of the second identity information to the first verification source, and sending a second part of the second identity information to the second verification source;

receiving a first result from the first verification source, and receiving a second result from the second verification source; and combining the first result and the second result to obtain the verification result.

In one embodiment, the secure identity information is generated in the following manner:

obtaining verified first identity information based on the second identity information and the verification result;

encrypting the verified first identity information by using the public key of the first service provider to obtain the encrypted information; and generating the secure identity information based on the encrypted information and the identification information of the first service provider.

In one example, the above verification result is a notification result of successful verification in the authentication mode; at this time, the successfully verified second identity information may be used as the verified first identity information.

In another example, the above verification result comprises a notification of successful verification and supplementary identity information determined based on at least a part of the successfully verified second identity information; at this time, the successfully verified second identity information and the supplementary identity information may be used as the verified first identity information.

According to the third aspect, a method for obtaining secure identity information is provided, wherein the method is performed by a registration platform, comprising:

receiving a query request from a first application, wherein the query request comprises two-dimensional code information, and the two-dimensional code information is obtained by scanning, by using the first application, a two-dimensional code generated by the registration platform in advance for a first service provider;

determining registration information of the first service provider based on the two-dimensional code information, wherein the registration information comprises at least a public key of the first service provider and first identity information required by the first service provider;

sending a query result to the first application, wherein the query result comprises identification information of the first service provider, the public key of the first service provider, and the first identity information;

receiving secure identity information from the first application, wherein the secure identity information comprises the identification information of the first service provider and encrypted information, and the encrypted information is obtained by encrypting the verified first identity information by using the public key of the first service provider; and sending the encrypted information to the first service provider according to the identification information of the first service provider.

In one embodiment, before receiving a query request from the first application, the method further comprises:

receiving the registration information from the first service provider; and generating a two-dimensional code for the first service provider based on the registration information.

In one embodiment, the registration information further comprises routing information of the first service provider; and sending the encrypted information to the first service provider specifically comprises:

extracting the identification information of the first service provider and the encrypted information respectively from the secure identity information;

determining the routing information of the first service provider according to the identification information of the first service provider; and sending the encrypted information to a terminal corresponding to the first service provider according to the routing information.

According to a possible design, the registration platform and a server of a specific application are located in the same physical entity; moreover, the query request comprises a first field, in the case that the first field has a first value, the first application is indicated to be the specific application, and in the case that the first field has a second value, the first application is indicated not to be the specific application.

Further, in one embodiment, the first field has a first value; at this time, the query result may be provided locally to application logic of the first application; and the secure identity information is obtained locally from the application logic of the first application.

According to the fifth aspect, an apparatus for providing secure identity information is provided, wherein the apparatus is deployed in a trusted application server, comprising:

a two-dimensional code obtaining unit configured to obtain two-dimensional code information corresponding to a two-dimensional code scanned by a user, wherein the two-dimensional code is generated by a registration platform in advance for a first service provider;

a query request sending unit configured to send a query request to the registration platform, wherein the query request comprises the two-dimensional code information;

a query result receiving unit configured to receive a query result from the registration platform, wherein the query result comprises identification information of the first service provider, a public key of the first service provider, and first identity information required by the first service provider;

an identity information obtaining unit configured to obtain second identity information of the user;

a verification sending unit configured to send the second identity information of the user to a verification source to obtain a verification result;

a secure information generation unit configured to generate secure identity information, wherein the secure identity information comprises the identification information of the first service provider and encrypted information, the encrypted information is obtained by encrypting the verified first identity information by using the public key of the first service provider, and the verified first identity information is determined based on the second identity information and the verification result; and a secure information sending unit configured to send the secure identity information to the registration platform, such that the registration platform sends the encrypted information to the first service provider.

According to the fourth aspect, an apparatus for obtaining secure identity information is provided, wherein the apparatus is deployed in a registration platform, comprising:

a query request receiving unit configured to receive a query request from a first application, wherein the query request comprises two-dimensional code information, and the two-dimensional code information is obtained by scanning, by using the first application, a two-dimensional code generated by the registration platform in advance for a first service provider;

a registration information determination unit configured to determine registration information of the first service provider based on the two-dimensional code information, wherein the registration information comprises at least a public key of the first service provider and first identity information required by the first service provider;

a query result sending unit configured to send a query result to the first application, wherein the query result comprises identification information of the first service provider, the public key of the first service provider, and the first identity information;

a secure information receiving unit configured to receive secure identity information from the first application, wherein the secure identity information comprises the identification information of the first service provider and encrypted information, and the encrypted information is obtained by encrypting the verified first identity information by using the public key of the first service provider; and an encrypted information sending unit configured to send the encrypted information to the first service provider according to the identification information of the first service provider.

According to the sixth aspect, a computer-readable storage medium having a computer program stored thereon is provided, wherein when executed in a computer, the computer program causes the computer to perform the method in the first aspect to the second aspect.

According to the seventh aspect, a computing device comprising a memory and a processor is provided, wherein the memory stores executable code, and when the processor executes the executable code, the methods in the first aspect to the second aspect are performed.

Through the method and apparatus provided in the embodiments of the present specification, in situations where identity verification is required, a user uses a trusted application to scan a two-dimensional code displayed by a service provider, thereby providing verified identity information to the service provider through a registration platform. Before providing the identity information, the trusted application first sends the identity information of the user to a third-party verification source for verification, thus ensuring the accuracy and authority of the provided identity information. Moreover, in the above process, interconnection between different service providers and different trusted applications is implemented through the registration platform. In this way, the service provider does not need to pay attention to an application used by the user to provide the identity information, and the verification is more flexible and convenient.

BRIEF DESCRIPTION OF THE DRAWINGS

In order to explain the technical solutions of the embodiments of the present invention more clearly, accompanying drawings used in the description of the embodiments will briefly introduced below. It is apparent that the accompanying drawings in the following description are only some embodiments of the present invention. For those of ordinary skill in the art, other accompanying drawings can be obtained from these accompanying drawings without creative efforts.

DETAILED DESCRIPTION OF THE EMBODIMENTS

The solutions provided by the present specification are described below with reference to the accompanying drawings.

Figure 1:
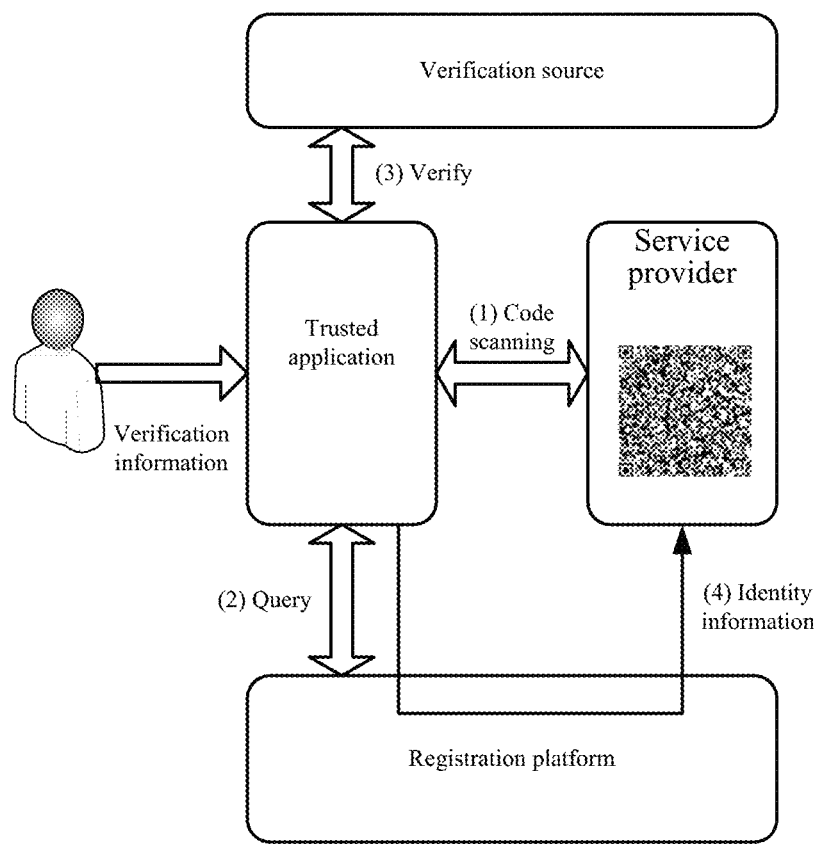
FIG. 1 is a schematic diagram of an implementation scenario of an embodiment disclosed in the present specification.

FIG. 1 is a schematic diagram of an implementation scenario of an embodiment disclosed in the present specification. According to the embodiment of FIG. 1, various service providers (that is, the foregoing scenario merchants) that require secure identity information register with a registration platform in advance, and the registration platform generates exclusive two-dimensional codes for the various service providers. In an offline scenario where identity verification or provision of identity information is required, a user does not need to directly provide identity information to the staff of a service provider, but uses a trusted application to scan a two-dimensional code displayed by the service provider, and then the obtained user identity information is submitted to an authoritative third-party verification source for identity verification. After the verification is successful, the trusted application provides encrypted identity information to the service provider through the registration platform.

Specifically, in the case that the user needs to perform identity verification or provide secure identity information, the user first scans, by using a scanning function in the trusted application, a two-dimensional code (e.g., a quick response (QR) code) displayed by the service provider. Then, the trusted application initiates a query to the registration platform for the two-dimensional code. The two-dimensional code is generated by the registration platform for the service provider, and therefore, the registration platform can obtain information corresponding to the two-dimensional code by query, including information regarding what identity information is required by which service provider. Once a query result containing the above information is obtained, the trusted application may correspondingly obtain the identity information of the user, such as name, identity card information, and face information, and then send the information to a third-party verification source for verification. If the verification is successful, the trusted application encrypts the successfully verified identity information and sends the same to the registration platform. After parsing, the registration platform forwards the encrypted identity information to the service provider. In this way, the service provider can obtain the required identity information through decryption. Specific implementation steps of the above process are described below.

Figure 2:
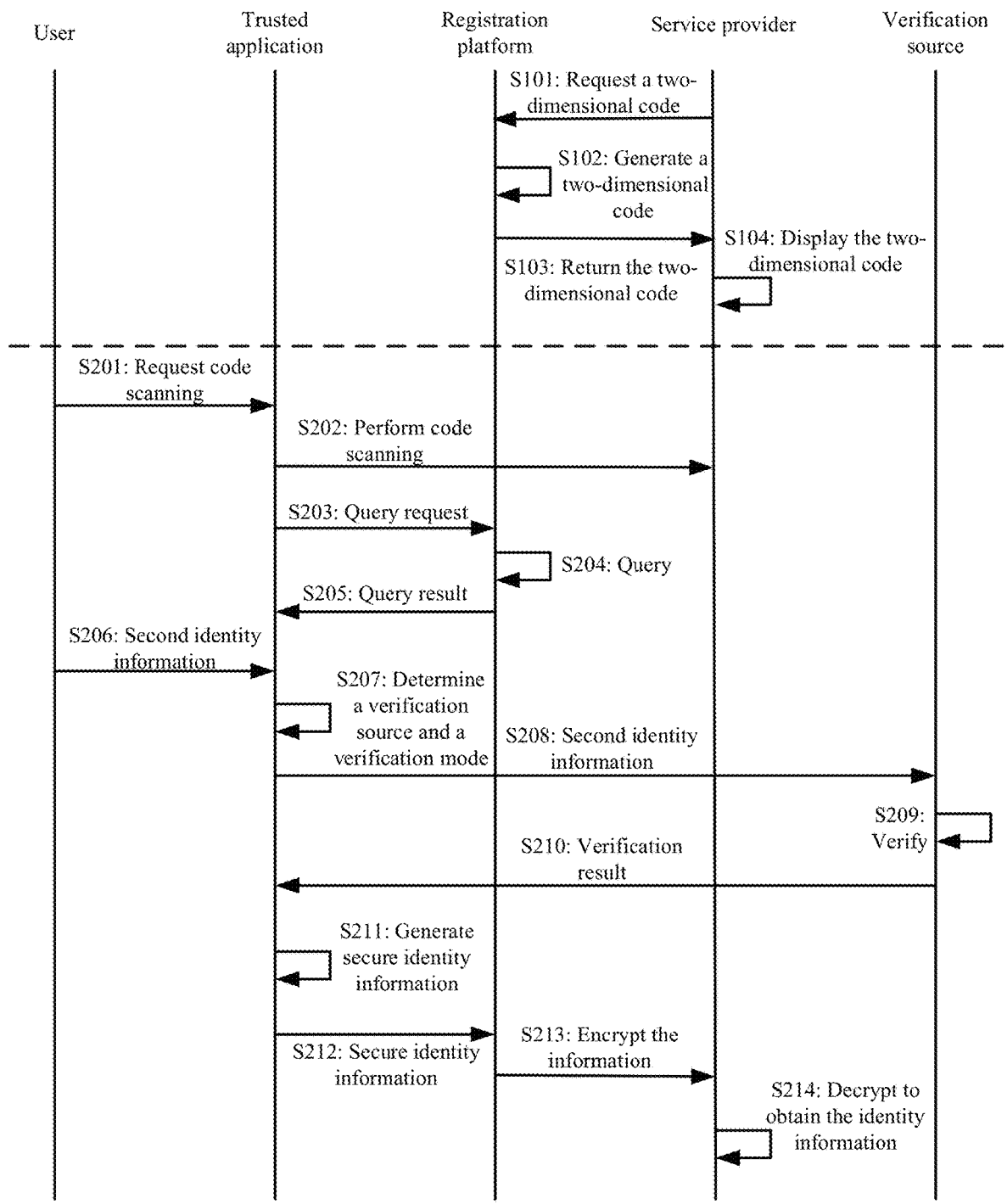
FIG. 2 shows a method for obtaining secure identity information according to an embodiment.

FIG. 2 shows a method for obtaining secure identity information according to an embodiment. As shown in FIG. 2, the method at least involves a trusted application, a verification source, a registration platform, and a service provider.

The verification source, also referred to as a trusted verification source or a third-party verification source, is a third party that provides a trusted identity information verification service. The third-party verification source usually possesses a trusted database and is configured with a verification strategy for trusted electronic identity, usually supports trusted credentials, and verifies, according to provided user information, whether it is true and accurate. Moreover, a verification result thereof is considered accurate and effective. The above verification source includes, for example, the cyber trusted identification CTID platform currently established by the First Research Institute of the Ministry of Public Security, the population database, and the like.

The service provider, or referred to as a scenario merchant, is a service application party that requires secure identity information in an offline application scenario. The service provider originally needs to confirm the user identity offline according to a physical identity document, and conducts services according to service logic after determining the trusted identity information of the user, such as a hotel, an administrative service hall, an Internet café, etc., that require identity verification.

The trusted application is an application trusted by the scenario merchant and the third-party verification source. The trusted application interfaces with the trusted verification source, and the credibility of both parties is ensured through signatures. The trusted application is, for example, Alipay.

The registration platform is responsible for maintaining the registration of the service provider, the registration of the trusted application, and the mapping and parsing of registration information and code strings. The registration platform can interface with several trusted applications and many service providers.

In the following, a process of obtaining and displaying a two-dimensional code by a service provider is first described, which corresponds to steps S101 to S104 in FIG. 2.

First, in step S101, a service provider that requires secure identity information submits registration information to a registration platform to request a two-dimensional code. Generally, the registration information includes at least a name of the service provider (such as a merchant id), a public key of the service provider, routing information of the service provider (such as a destination address and gateway information), and identity information required by the service provider, referred to as first identity information hereinafter. Optionally, the registration information may also include other information, such as some description information.

In different embodiments, the first identity information may include one or more of name, identity card number, ethnicity, validity period of the identity document, face photo, driver's license information, and the like. The first identity information indicates the particular requirement for the user identity information set by the service provider. The specific content is set by the service provider according to service logic thereof or is uniformly regulated by the industry to which the service provider belongs.

The registration platform generates a service index, or referred to as a service token, for the registration information submitted by the service provider and binds the service index to the registration information, in other words, stores the service index and the registration information associatively and correspondingly.

Next, in step S102, the registration platform generates two-dimensional code information according to the registration information of the service provider. It could be understood that each two-dimensional code may correspond to a code string, and the code string may be mapped to a two-dimensional code. Therefore, the two-dimensional code information referred to herein may be either the two-dimensional code itself or the code string corresponding to the two-dimensional code.

Specifically, in one example, the registration platform may compile the above service index into a code string to generate a two-dimensional code. In another example, the registration platform may also compile registration information into a code string to generate a two-dimensional code.

In step S103, the registration platform returns the two-dimensional code information to the service provider. In this step, the registration platform may return either a two-dimensional code pattern or a code string to the service provider, such that the service provider can map the code string to a two-dimensional code according to an agreed method.

Therefore, in step S104, the service provider can display the two-dimensional code according to the obtained two-dimensional code information for a user in need to scan. For example, the service provider may print out the two-dimensional code and display the same at the reception; or, the service provider may use an electronic display device to display the two-dimensional code.

It should be understood that the above process of obtaining and displaying the two-dimensional code is a preliminary step for the user to perform security verification through the two-dimensional code, which is performed in advance before the user performs the identity verification and provides the secure identity information.

A process in which the user performs identity verification by code scanning using the trusted application and then provides secure identity information to the service provider is described below.

It could be understood that the user is usually a natural person and is also a subject of electronic identity verification, such as an Alipay user. When the user encounters a scenario that requires identity verification offline, for example, when checking in a hotel that requires identity verification, instead of providing the identity card to the receptionist of the hotel, the user may open the trusted application and request the trusted application to scan the two-dimensional code displayed by the service provider. In other words, as shown in FIG. 2, in step S201, the user sends a request to the trusted application for requesting the trusted application to perform code scanning and read the two-dimensional code displayed by the service provider. For example, in one example, the user may open Alipay and click "Scan" to send a code scanning request.

In step S202, the trusted application performs code scanning to obtain two-dimensional code information corresponding to the two-dimensional code scanned by the user. It could be understood that the two-dimensional code is generated by the registration platform in advance for the service provider, as shown in the foregoing steps S101-S104.

More specifically, a client of the trusted application reads an image of the two-dimensional code by calling a camera equipped on a terminal where the client resides, obtains corresponding two-dimensional code information, and transmits the two-dimensional code information to a server.

It could be understood that the two-dimensional code will carry information of a generator of the two-dimensional code, such as an identification or address. Therefore, after scanning the two-dimensional code, the trusted application may parse the two-dimensional code in a conventional manner, determine the registration platform that generates the two-dimensional code, and obtain a code string corresponding to the two-dimensional code. However, it should be understood that the above two-dimensional code information is generated by the registration platform performing various operations such as encoding and mapping based on the registration information of the service provider according to a certain rule (as shown in the foregoing step S102). Although the trusted application can read the code string corresponding to the two-dimensional code, it cannot obtain the service provider information by parsing the code string. Therefore, the trusted application still needs to interact with the registration platform to obtain information related to the service provider by query.

Therefore, in step S203, the trusted application (server) sends a query request to the registration platform, and the query request includes the two-dimensional code information.

In step S204, the registration platform performs query according to the received query request. Specifically, the query includes at least determining a corresponding service provider and registration information of the service provider based on the two-dimensional code information contained in the query request. In one example, the registration platform may determine the corresponding service index based on the two-dimensional code information, and then determine associatively stored registration information based on the service index. As mentioned above, the registration information includes at least the name of the service provider, the public key of the service provider, the routing information of the service provider, and the identity information required by the service provider. The identity information required by the service provider is referred to as first identity information below. It should be understood that the "first" and "second" herein are merely used for clear expression to mark and distinguish similar concepts, and do not have other limiting effects.

It could be understood that the two-dimensional code displayed by the service provider is generated by the registration platform according to the registration information of the service provider in the previous step S102. Therefore, the registration platform can reversely determine the registration information of the service provider from the two-dimensional code information according to a reverse operation of the operation used when the two-dimensional code is generated.

After the registration information of the service provider is obtained by query, in step S205, the registration platform returns a query result to the trusted application, which includes the identification information of the service provider, the public key of the service provider, and the first identity information required by the service provider. Here, the registration platform may use the name of the service provider in the registration information as the identification information of the service provider, or use the service index generated by the registration platform therefor as the identification information, as long as the registration platform can determine information of the corresponding service provider according to the identification information.

Subsequent to receiving such query result, in step S206, the trusted application obtains various types of identity information of the user according to the first identity information required by the service provider, and the obtained user identity information is referred to as second identity information.

Specifically, the identity information of the user may be obtained by adopting a plurality of methods such as hardware collection, manual input by the user, and reading of existing information. In one implementation manner, the trusted application first determines a method of obtaining user identity information according to content of the to-be-obtained identity information, as well as the configuration status of hardware and control of the terminal where it is located.

In one embodiment, the terminal is configured with corresponding hardware and controls, and then obtaining second identity information in step S206 may include collecting the second identity information through the terminal where the client of the trusted application is located. For example, in one example, the face information can be collected through a camera on the terminal; and in another example, the identity card information can be read through a near-field communication (NFC) function or module of the terminal and controls thereon.

In another embodiment, obtaining second identity information in the step S206 may include rendering an input interface through the client of a trusted application, and receiving input information of the user. For example, the input information may include a user name, an identity card number, a password, and the like.

In another embodiment, obtaining second identity information in the step S206 may include reading user identity information stored in the trusted application. For example, the user may store his/her name and identity card number in the client or server of the trusted application in advance. In this way, in step 206, the user identity information that has been stored in the trusted application can be directly extracted, so as to reduce the number of manual inputs by the user and improve the convenience of the user.

The above embodiments may be used in combination. For example, in one example, a second-generation identity card of the user can be read through an NFC function and corresponding controls of a terminal to obtain the name, identity card number, and validity period of the identity document, and a face photo can be collected through the camera of the terminal to be used as the second identity information.

In another example, the name and identity card number manually input by the user can be received through the client, and the face photo can be collected through the camera to be used as the second identity information.

In this way, in step S206, the trusted application obtains the second identity information of the user through a plurality of methods.

After obtaining the identity information of the user, the trusted application needs to submit the obtained identity information to the verification source for verification to ensure the security and accuracy of the identity information. In the case that an interfaced verification source is not unique, and/or a verification mode is not unique, in one embodiment, after the trusted application obtains the second identity information, in step S207, the required verification source and the required verification mode are determined according to the required first identity information and the obtained second identity information.

It could be understood that the trusted application may interface with a plurality of verification sources in advance. When interfacing with each verification source, the two parties will have a clear agreement on what information to be verified and a supported verification mode. Therefore, the required verification sources and the required verification mode may be determined according to information content of the first identity information and the second identity information.

Generally, the verification mode provided by the verification source includes an authentication mode and an information mode. In the authentication mode, after verifying the sent identity information, the verification source returns a notification result of whether the verification is successful. In the information mode, the verification result returned by the verification source includes a notification of whether the verification is successful, and supplementary identity information determined based on the successfully verified identity information.

In one implementation manner, the second identity information obtained in step S206 is the first identity information required by the service provider, and may even contain more content. In this case, it can be determined in step S207 that only the authentication mode is required. In other words, it only needs to know whether each item of the second identity information is successfully verified.

In another possible implementation manner, due to difficulty in collection or other reasons, the obtained second identity information may also be a part of the first identity information. At this time, it is necessary to provide supplementary information by assistance of the verification source. Therefore, in this case, it can be determined in step S207 that the required verification mode is the information mode.

Therefore, in step S208, the trusted application sends the second identity information to the corresponding verification source according to the verification source and verification mode determined above, and requests verification in the corresponding verification mode. In this process, the trusted application and the verification source may establish a trust relationship through a signature and signature verification, thus ensuring data security and effectiveness.

In step S209, the verification source verifies the obtained identity information according to the requested verification mode.

In the authentication mode, the verification of the verification source for the identity includes comparison of information. In one example, the verification source stores complete user information. In this case, the verification source performs user identity verification by directly comparing the obtained second identity information with the stored user information. In another example, in order to avoid being attacked and leaking user information in batches, the verification source may therefore configure a policy to store only a hash value of the user information. In this case, the verification source performs the same hash operation on the received user identity information, and compares the computed hash value with the stored hash value to thus perform user identity verification. Further, the verification source may delete the received user information within a certain time interval to increase the security.

In the information mode, the verification source first compares the received identity information with the stored corresponding information, and after confirming that the received identity information is accurate and contains no error, determines supplementary identity information based on such information.

For example, as a verification source, the population database may perform verification on the received user name and identity card number in the information mode. After the verification is successful, ethnic information of the user is determined as the supplementary identity information based on the name and identity card number.

After the verification, in step S210, the verification source returns a verification result to the trusted application. As mentioned above, in the authentication mode, the verification source may feed back the notification result of successful/failed verification, and in the information mode, the verification source may also return the supplementary identity information.

The process of performing identity verification through a single verification source is described above. However, in some cases, a single verification source is not enough to verify and obtain the first identity information. Therefore, in step S207, it can be determined that multiple verification sources are required. For simplicity and convenience of description, it is assumed that the required verification sources include a first verification source and a second verification source.

In this case, in step S208, the trusted application sends a first part of the second identity information to the first verification source, and sends a second part of the second identity information to the second verification source. In one embodiment, the above first part and second part may have an intersection.

In step S209, the first verification source verifies the first part of the second identity information, and the second verification source verifies the second part of the second identity information.

In step S210, the trusted application receives a first result from the first verification source and a second result from the second verification source. After that, the trusted application further combines the first result and the second result to obtain an overall verification result.

The above multiple verification sources may each have a different verification mode. Therefore, embodiments of different numbers of verification sources can be combined with embodiments of performing verification in different modes.

For example, in one embodiment, the first identity information required by the service provider includes: user name, identity card number, face, and user ethnicity. In step S206, the obtained second identity information includes: the name and identity card number manually input by the user, and the collected face photo. According to the above first identity information and second identity information, the trusted application determines that the verification source of the First Research Institute of the Ministry of Public Security (the first verification source) may be adopted to verify the name, identity card number, and face in the authentication mode, and the population database (the second verification source) may be adopted to obtain, in the information mode, ethnic information through the user name+identity card number and use the same as supplementary identity information.

Therefore, in step S208, the trusted application sends the user name, identity card number, and face to the First Research Institute of the Ministry of Public Security to request verification in the authentication mode, and sends the user name and identity card number to the population database to request verification in the information mode.

In another embodiment, the first identity information required by the service provider includes: user name, identity card number, face, and user ethnicity. In step S206, the obtained second identity information includes: the name, identity card number, and ethnicity manually input by the user, and the collected face photo. According to the above first identity information and second identity information, the trusted application determines that the verification source of the First Research Institute of the Ministry of Public Security (the first verification source) may be adopted to verify the name, identity card number, and face in the authentication mode, and the population database (the second verification source) may be adopted to verify the ethnic information of the user in the authentication mode.

Therefore, in step S208, the trusted application sends the user name, identity card number, and face to the First Research Institute of the Ministry of Public Security to request verification in the authentication mode, and sends the user name, identity card number, and ethnicity to the population database to request verification in the authentication mode.

In step S210, the trusted application obtains verification results of various verification sources, and combines the verification results. According to the verification modes of the different verification sources, the combined verification result can be expressed in different forms.

In one example, the combined verification result includes content of various verified information items. For example, in a specific example, the verification result may be expressed as: the user name is , the user identity card number is , the user ethnicity is ***, and the user face is consistent with the face on the identity card.

In another example, the combined verification result includes a result of whether various information items obtained in the authentication mode are correct. For example, in a specific example, the verification result may be expressed as: the user name is correct, the user identity card number is correct, the user ethnicity is correct, and the user face is consistent with the face on the identity card.

In another example, the combined verification result includes content of various information items obtained in the authentication mode, and a result of whether the content is correct, as well as supplementary identity information provided in the information mode. For example, in one example, the verification result may be expressed as: the user name is * and is correct, the user identity card number is * and is correct, the user ethnicity is *** (supplementary identity information), the user face is consistent with the face on the identity card.

It could be understood that the specific expression form of the verification result may not be limited to the above examples.

Based on the verification result obtained above, in step S211, the trusted application generates secure identity information.

Specifically, in one embodiment, the trusted application may first obtain the verified first identity information based on the second identity information and the above verification result.

More specifically, in one example, the obtained second identity information has information items consistent with those of the required first identity information, or even contains more content. Moreover, in the foregoing steps, it is requested to perform verification on the second identity information in the authentication mode. If the verification result shows that the various information items of the second identity information are successfully verified, then the successfully verified second identity information can be used as the verified first identity information.

In another example, the obtained second identity information is a part of the required first identity information. Moreover, in the foregoing steps, it is requested to perform verification on the second identity information in the information mode. If the verification result in the information mode includes the notification of successful verification and the supplementary identity information determined based on the information items that are successfully verified, then in this step, the successfully verified second identity information and the supplementary identity information are together used as the verified first identity information.

Then, the trusted application uses the public key of the service provider obtained in step S205 to encrypt the verified first identity information obtained in the foregoing, to obtain encrypted information.

In addition, the trusted application further attaches the identification information of the service provider in addition to the above encrypted information, and then generates the secure identity information.

Next, in step S212, the trusted application sends the abovementioned generated secure identity information to the registration platform.

In step S213, the registration platform sends the encrypted information in the secure identity information to the service provider.

Specifically, after receiving the above secure identity information, the registration platform may extract the encrypted information and the identification information of the service provider therefrom. Once the identification information of the service provider is obtained, the registration platform can determine the corresponding service provider, and determine routing information of the service provider, such as a destination address, according to the information when the service provider is registered. Then, the trusted application sends the encrypted information to the terminal corresponding to the first service provider according to the routing information (for example, the destination address).

After receiving the encrypted information, the service provider decrypts the encrypted information in step S214 to obtain the required first identity information.

It could be understood that the encrypted information is obtained by the trusted application encrypting the verified first identity information using the public key of the service provider, and the service provider locally stores a private key corresponding to the public key. The public key is a key paired with the private key, and can be used to decrypt data encrypted by the other key. Therefore, in one embodiment, the service provider uses its own private key to decrypt the received encrypted information, so as to obtain the verified first identity information of the user.

After obtaining the required identity information, the service provider may conduct services based on its service logic. For example, an Internet cafe may determine whether the age of a user meets a standard, a hotel may perform check-in based on the name and identity card number of a user, and the like.

As can be seen from the above description, in an offline scenario where identity verification or provision of identity information is required, a user does not need to hand over an identity document to the staff of a service provider, but can use a trusted application to scan a two-dimensional code displayed by the service provider, wherein the two-dimensional code is generated by the service provider registering with the registration platform in advance. After scanning the code, the trusted application obtains, by making a query to the registration platform, information regarding what identity information is required by the service provider, and then collects and obtains the identity information of the user. After that, the trusted application sends the obtained identity information to a verification source for verification, encrypts the successfully verified identity information, and forwards the same to the service provider through the registration platform. In this process, a public registration platform is introduced to implement interconnection between different service providers and different trusted applications. Therefore, a service provider only needs to display a two-dimensional code, which can be applied to a plurality of types of trusted applications interfaced with the registration platform, and it is unnecessary to display a two-dimensional code for each application. In addition, only after sending the identity information of the user to a third-party verification source for verification, the trusted application provides the verified identity information to the service provider, thus ensuring the accuracy and authority of the provided identity information.

As known by those skilled in the art, generally, a trusted application includes a client and a server. The client is, for example, an App installed on a mobile terminal (for example, the Alipay App), or an application software client on a PC. In the method shown in FIG. 2, interactions between the trusted application and the user are all performed through the client. For example, in step S201, the user sends a code scanning request through the client, for example, clicks a corresponding option in a client interface, such as "Scan." In step S202, the client calls the camera of the terminal to read the two-dimensional code, obtains the two-dimensional code information, and sends the two-dimensional code information to the server. In step S206, according to one implementation manner, at least a part of the second identity information of the user may be collected or received through the client. In addition, other steps, including the steps of the trusted application interacting with the verification source, as well as the steps of interacting with the registration platform, are all performed through the server.

Figure 3:
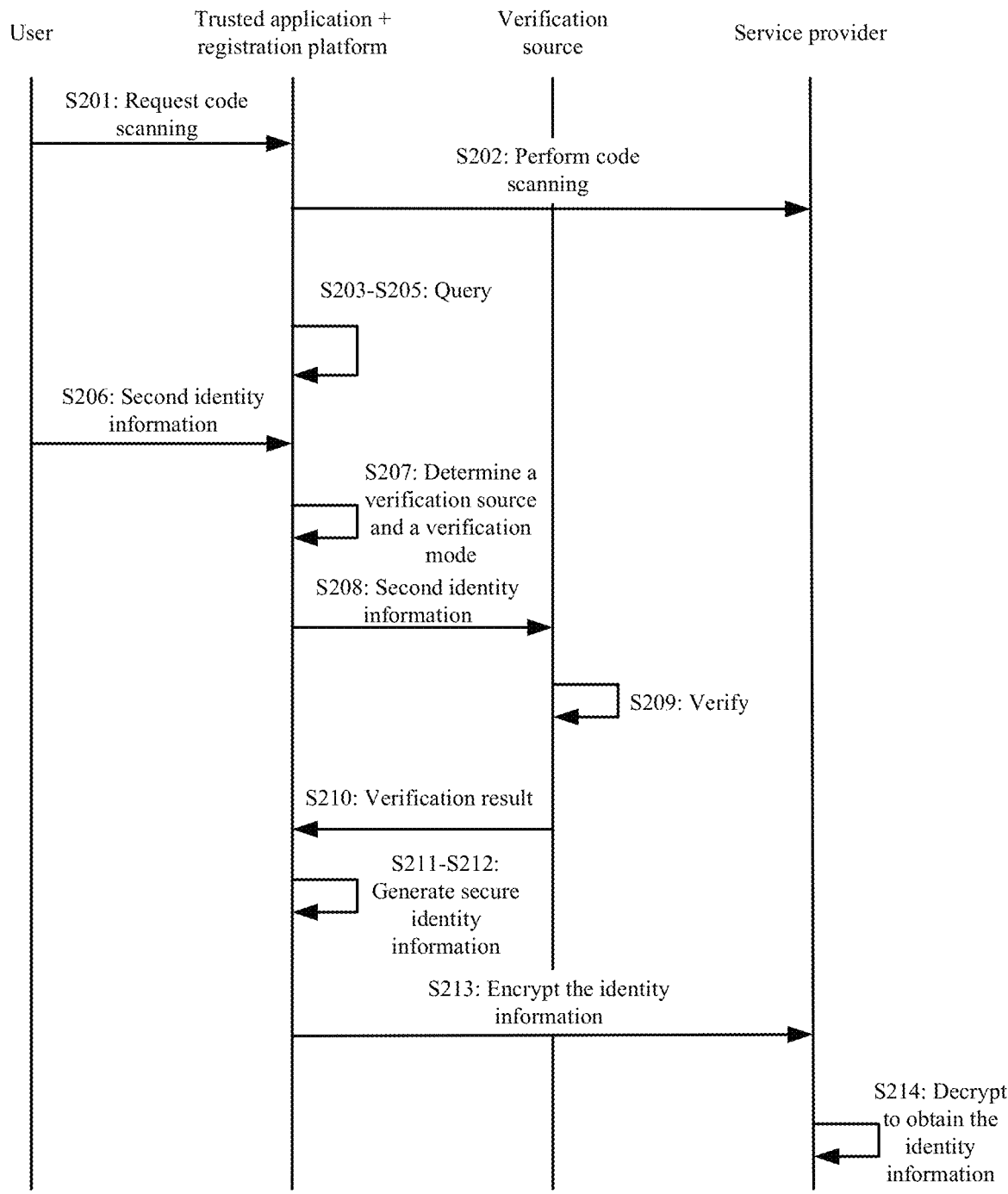
FIG. 3 shows a method for obtaining secure identity information according to another embodiment.

FIG. 3 shows a method for obtaining secure identity information according to another embodiment. In the embodiment of FIG. 3, a registration platform and a specific application are located in the same physical entity, so it is simply shown as a trusted application+a registration platform. Hereinafter, the entity where the trusted application and the registration platform are located is referred to as a unified server.

In this case, the registration platform can still interface with multiple trusted applications, including a local specific application and other applications. The service provider still initiates a registration request to the registration platform in advance by using the registration information to obtain and display a two-dimensional code. Each trusted application still obtains two-dimensional code information of the service provider through scanning and initiates a query request to the registration platform for the read two-dimensional code. In one embodiment, the query request may include a specific field (hereinafter referred to as a first field), which is used to indicate whether the trusted application initiating the request is a local trusted application of the registration platform.

It is assumed that the registration platform receives a query request from a first application. In addition to the two-dimensional code information, the query request further includes the first field. In the case that the first field has a first value (for example, the value is 1), the first application is indicated to be a local specific application of the registration platform, and in the case that the first field has a second value (for example, the value is 0), the first application is indicated not to be a local specific application.

If the first field has the second value, that is, request information received by the registration platform comes from a non-local trusted application, and then the subsequent steps will be performed according to the communication interaction method shown in FIG. 2.

If the first field has the first value, that is, request information received by the registration platform comes from a local trusted application, then interactions between the registration platform and the trusted application can be performed locally, that is, performed inside the unified server as shown in FIG. 3.

Specifically, after receiving the query request, the registration platform performs query on the two-dimensional code information to obtain the registration information of the service provider, and generates a query result based on the registration information. In the case that the first application is a local specific application, the registration platform may locally provide the above query result to application logic of the first application. Therefore, steps S203 to S205 in FIG. 2 may be performed inside the unified server, and are shown as query steps in FIG. 3.

After the trusted application (in its application logic) generates secure identity information based on the verified first identity information, the registration platform can locally obtain the secure identity information from the application logic of the first application, obtain encrypted information from the secure identity information, and provide the encrypted information to the service provider. In other words, steps S211 to S212 in FIG. 2 can be performed inside the unified server, as shown in FIG. 3.

Other steps, such as identity verification steps from S207 to S210 and interaction steps with the service provider, are the same as those shown in FIG. 2, and will not be repeated.

Through the methods in the embodiments shown in FIG. 2 to FIG. 3, in the case of requiring identity verification, a user uses a trusted application to scan a two-dimensional code displayed by a service provider, thereby providing verified identity information to the service provider through a registration platform. Before providing the identity information, the trusted application first sends the identity information of the user to a third-party verification source for verification, thus ensuring the accuracy and authority of the provided identity information. Moreover, in the above process, interconnection between different service providers and different trusted applications is implemented through the registration platform. In this way, the service provider does not need to pay attention to which application is used by the user to provide the identity information, and the verification is more flexible and convenient.

The above process of obtaining secure identity information involves multi-party interactions among the trusted application, the registration platform, and the service provider. Apparatus configurations of the above parties are described below.

Figure 4:
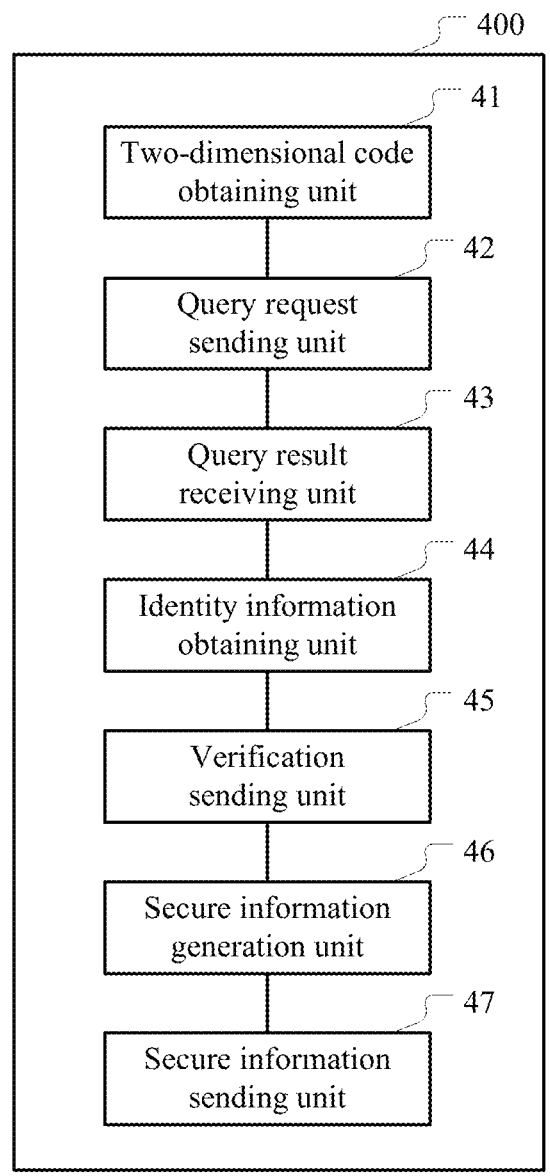
FIG. 4 is a schematic block diagram of an apparatus for providing secure identity information according to an embodiment.

FIG. 4 is a schematic block diagram of an apparatus for providing secure identity information according to an embodiment, and the apparatus is deployed in a trusted application server. As shown in FIG. 4, apparatus 400 includes:

a two-dimensional code obtaining unit 41 configured to obtain two-dimensional code information corresponding to a two-dimensional code scanned by a user, wherein the two-dimensional code is generated by a registration platform in advance for a first service provider;

a query request sending unit 42 configured to send a query request to the registration platform, wherein the query request includes the two-dimensional code information;

a query result receiving unit 43 configured to receive a query result from the registration platform, wherein the query result includes identification information of the first service provider, a public key of the first service provider, and first identity information required by the first service provider;

an identity information obtaining unit 44 configured to obtain second identity information of the user;

a verification sending unit 45 configured to send the second identity information of the user to a verification source to obtain a verification result;

a secure information generation unit 46 configured to generate secure identity information, wherein the secure identity information includes the identification information of the first service provider and encrypted information, the encrypted information is obtained by encrypting the verified first identity information by using the public key of the first service provider, and the verified first identity information is determined based on the second identity information and the verification result; and a secure information sending unit 47 configured to send the secure identity information to the registration platform, such that the registration platform sends the encrypted information to the first service provider.

According to one implementation manner, the identity information obtaining unit 44 is configured to collect the second identity information through a terminal where a client of the trusted application is located.

Further, in a specific embodiment, the identity information obtaining unit 44 may collect the second identity information as follows: collecting face information through a camera on the terminal; and/or, reading identity card information through an NFC function of the terminal and controls thereon.

According to another implementation manner, the identity information obtaining unit 44 is configured to receive input information of the user through the client of the trusted application.

In a possible design, the above apparatus further includes a determination unit (not shown) configured to determine the verification source and a required verification mode based on the required first identity information and the obtained second identity information.

Further, in one embodiment, the obtained second identity information includes the required first identity information; in this case, the determination unit may determine that the required verification mode is an authentication mode, and in the authentication mode, the verification result is a notification result of whether the verification is successful.

In another embodiment, the obtained second identity information is a part of the required first identity information; in this case, the determination unit may determine that the required verification mode is an information mode, and in the information mode, the verification result includes a notification of whether the verification is successful, and supplementary identity information determined based on at least a part of the successfully verified second identity information.

According to one embodiment, the required verification source determined by the determination unit includes a first verification source and a second verification source; in this case, the verification sending unit 45 is configured to:

send a first part of the second identity information to the first verification source, and send a second part of the second identity information to the second verification source;

receive a first result from the first verification source, and receive a second result from the second verification source; and combine the first result and the second result to obtain the verification result.

In one embodiment, secure information generation unit 46 is specifically configured to:

obtain verified first identity information based on the second identity information and the verification result;

encrypt the verified first identity information by using the public key of the first service provider to obtain the encrypted information; and generate the secure identity information based on the encrypted information and the identification information of the first service provider.

In one example, the above verification result is a notification result of successful verification in the authentication mode; at this time, secure information generation unit 46 may use the successfully verified second identity information as the verified first identity information.

In another example, the above verification result includes a notification of successful verification and supplementary identity information determined based on at least a part of the successfully verified second identity information; at this time, secure information generation unit 46 may use the successfully verified second identity information and the supplementary identity information as the verified first identity information.

Figure 5:
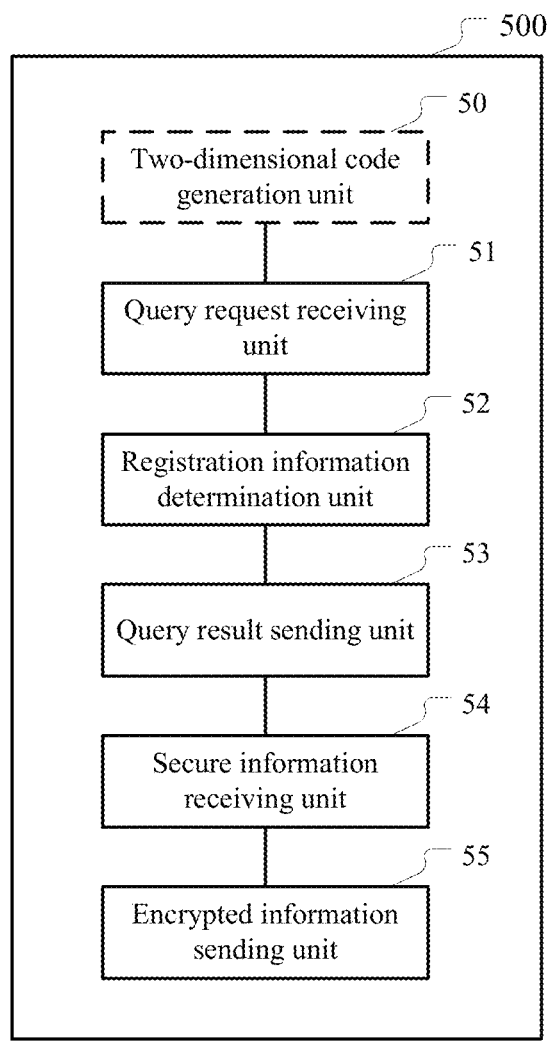
FIG. 5 is a schematic block diagram of an apparatus for obtaining secure identity information according to an embodiment.

FIG. 5 is a schematic block diagram of an apparatus for obtaining secure identity information according to an embodiment, and the apparatus is deployed in a registration platform. As shown in FIG. 5, apparatus 500 includes:

a query request receiving unit 51 configured to receive a query request from a first application, wherein the query request comprises two-dimensional code information, and the two-dimensional code information is obtained by scanning, by using the first application, a two-dimensional code generated by the registration platform in advance for a first service provider;

a registration information determination unit 52 configured to determine registration information of the first service provider based on the two-dimensional code information, wherein the registration information comprises at least a public key of the first service provider and first identity information required by the first service provider;

a query result sending unit 53 configured to send a query result to the first application, wherein the query result comprises identification information of the first service provider, the public key of the first service provider, and the first identity information;

a secure information receiving unit 54 configured to receive secure identity information from the first application, wherein the secure identity information comprises the identification information of the first service provider and encrypted information, and the encrypted information is obtained by encrypting the verified first identity information by using the public key of the first service provider; and an encrypted information sending unit 55 configured to send the encrypted information to the first service provider according to the identification information of the first service provider.

In one embodiment, the above apparatus 500 further includes a two-dimensional code generation unit 50 configured to receive the registration information from the first service provider; and generate a two-dimensional code for the first service provider based on the registration information.

In one embodiment, the registration information further includes routing information of the first service provider; and the encrypted information sending unit 55 is specifically configured to:

extract the identification information of the first service provider and the encrypted information respectively from the secure identity information;

determine the routing information of the first service provider according to the identification information of the first service provider; and send the encrypted information to a terminal corresponding to the first service provider according to the routing information.

According to a possible design, the registration platform and a server of a specific application are located in the same physical entity; moreover, the query request received by query request receiving unit 51 includes a first field. In the case that the first field has a first value, the first application is indicated to be the specific application, and in the case that the first field has a second value, the first application is indicated not to be the specific application.

Further, in one embodiment, the first field has a first value; at this time, query result sending unit 53 may locally provide the query result to application logic of the first application; moreover, secure information receiving unit 54 may obtain the secure identity information locally from the application logic of the first application.

According to an embodiment of another aspect, a computer-readable storage medium having a computer program stored thereon is further provided, wherein when the computer program is executed in a computer, the computer is caused to perform the method described with reference to FIG. 2 to FIG. 3.

According to an embodiment of still another aspect, a computing device including a memory and a processor is further provided, wherein the memory stores executable code, and when the processor executes the executable code, the methods described with reference to FIG. 2 to FIG. 3 are implemented.

Figure 6:
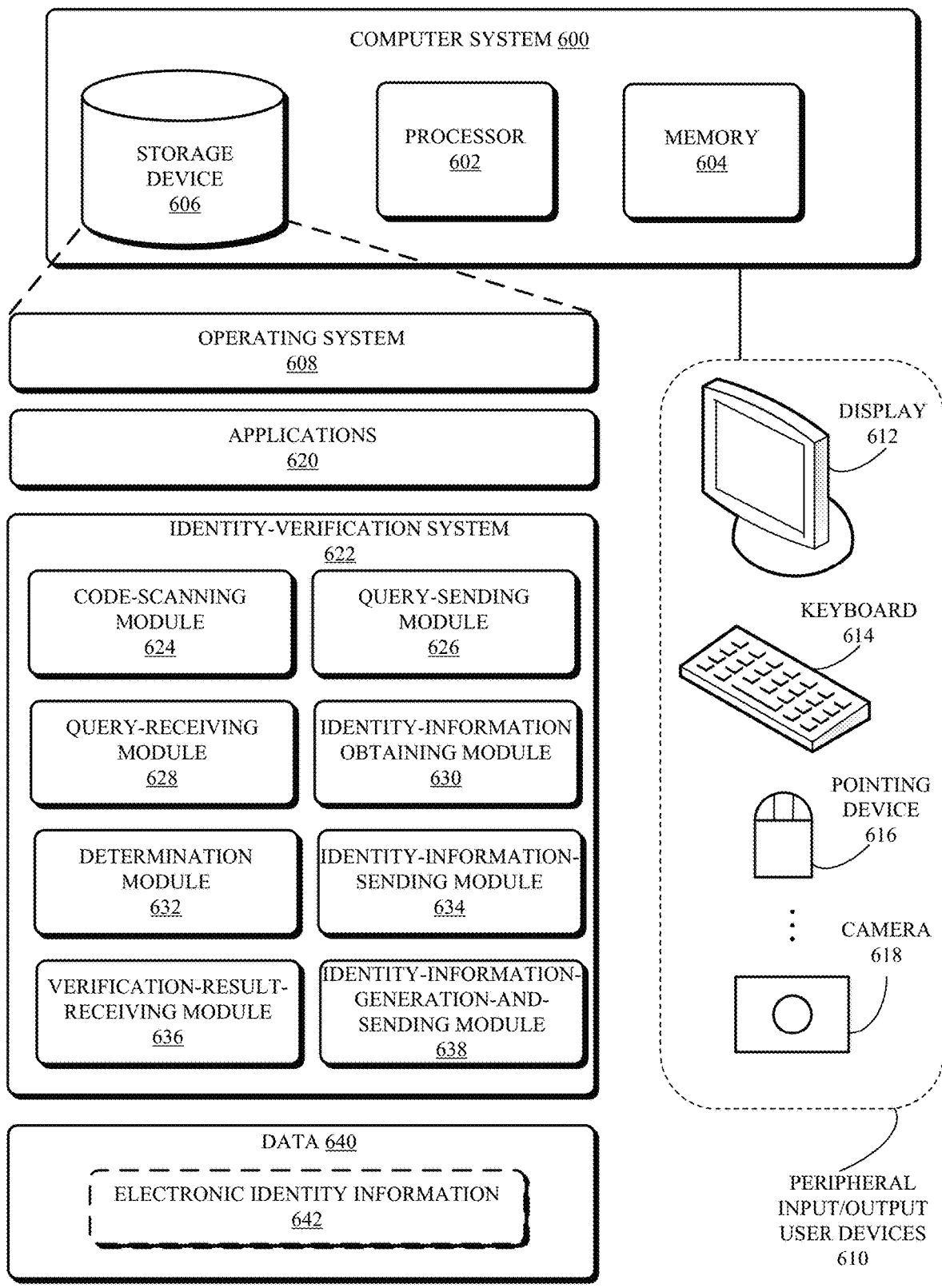
FIG. 6 illustrates an exemplary computer and communication system for identify verification, according to one embodiment.

FIG. 6 illustrates an exemplary computer and communication system for identify verification, according to one embodiment. In FIG. 6, computer system 600 can include a processor 602, a memory 604, and a storage device 606. Furthermore, computer system 600 can be coupled to peripheral input/output (I/O) user devices 610, e.g., a display device 612, a keyboard 614, a pointing device 616, and a camera 618. Storage device 606 can store an operating system 608, one or more applications 620, an identity-verification system 622, and data 640. In one embodiment, computer system 600 can be a mobile terminal device of a user.

Applications 620 can include instructions, which can be loaded from storage device 606 into memory 604 and executed by processor 602. As a result, computer system 600 can perform specific functions provided by applications 620.

Identity-verification system 622 can include instructions, which when executed by computer system 600, can cause computer system 600 or processor 602 to perform methods and/or processes described in this disclosure. Specifically, identity-verification system 622 can include instructions for scanning (e.g., via camera 618) a two-dimensional code (code-scanning module 624), instructions for sending a query request to a registration platform to query the scanned code (query-sending module 626), instructions for receiving the query result from the registration platform (query-result-receiving module 628), instructions for obtaining identity information from the user (identify-information-obtaining module 630), instructions for determining a verification source and a verification mode (determination module 632), instructions for forwarding the user identity information to the verification source (identify-information-forwarding module 634), instructions for receiving a verification result (verification-result-receiving module 636), instructions for generating and sending secure identity information to the service provider via the registration platform (identity-information-generation-and-sending module 638).

Data 640 can optionally include electronic identity information 642 associated with the user.

In some embodiments, applications 620 and the various modules in identity-verification system 622, such as modules 624, 626, 628, 630, 632, 634, 636, and 638 can be partially or entirely implemented in hardware and can be part of processor 602. Further, in some embodiments, the system may not include a separate processor and memory. Instead, in addition to performing their specific tasks, modules 620, 624, 626, 628, 630, 632, 634, 636, and 638, either separately or in concert, may be part of general- or special-purpose computation engines.

Figure 7:
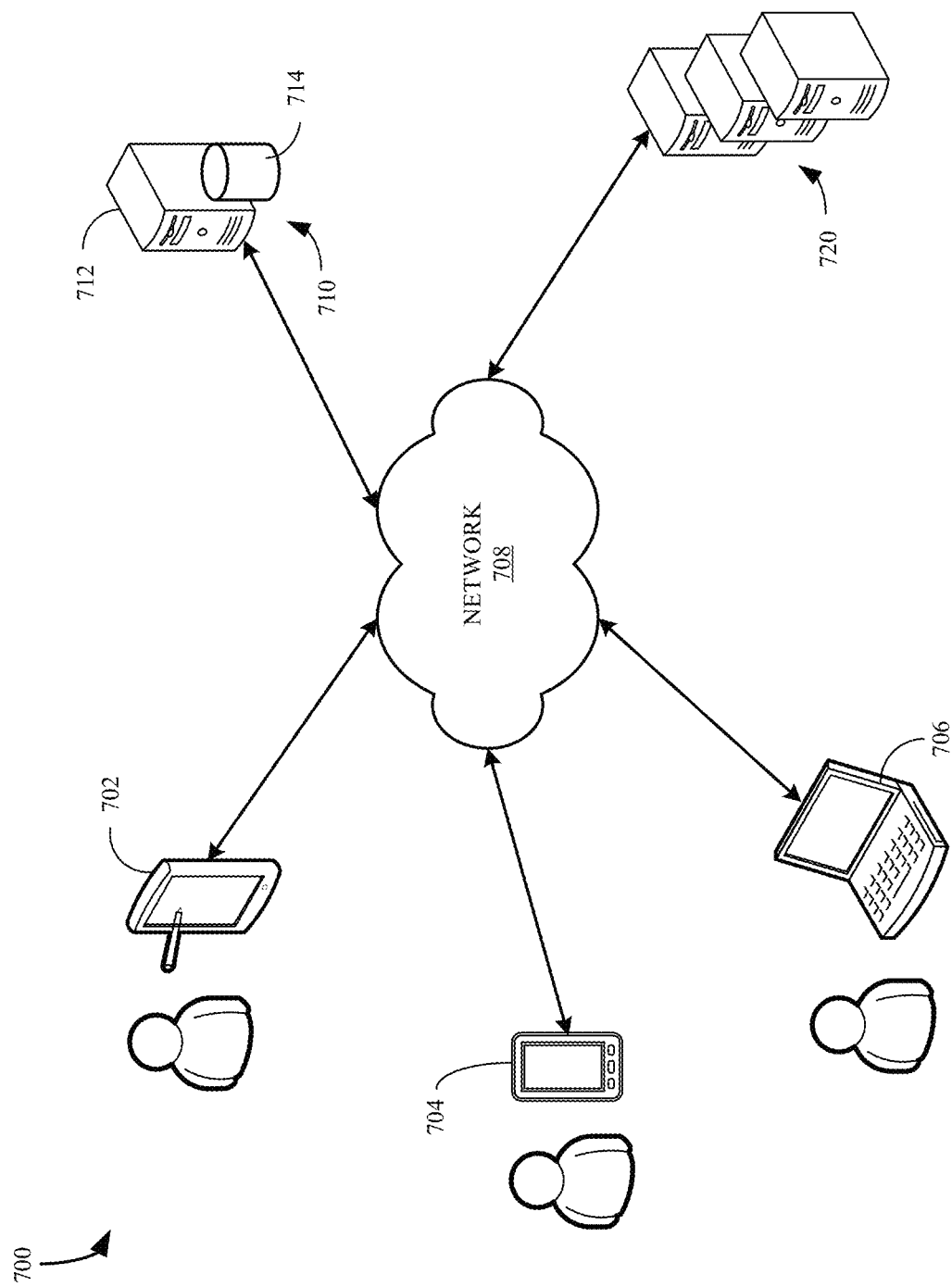
FIG. 7 illustrates an exemplary network environment for implementing the disclosed technology, in accordance with some embodiments described herein.

FIG. 7 illustrates an exemplary network environment for implementing the disclosed technology, in accordance with some embodiments described herein. A network environment 700 includes a number of electronic devices 702, 704 and 706 communicably connected to a server 710 by a network 708. One or more remote servers 720 are further coupled to the server 710 and/or the one or more electronic devices 702, 704 and 706.

In some exemplary embodiments, electronic devices 702, 704 and 706 can be computing devices such as laptop or desktop computers, smartphones, PDAs, wearable devices (e.g., smartwatches, smartglasses, etc.) portable media players, tablet computers, televisions or other displays with one or more processors coupled thereto or embedded therein, or other appropriate computing devices that can be used for displaying a web page or web application. In one example, the electronic devices 702, 704 and 706 store a user agent such as a browser or application. In the example of FIG. 7, electronic device 702 is depicted as a tablet computer, electronic device 704 is depicted as a smartphone, and electronic device 706 is depicted as a laptop computer.

Server 710 includes a processing device 712 and a data store 714. Processing device 712 executes computer instructions stored in data store 714, for example, to assist in scheduling a customer-initiated service or a service-provider-initiated service between a service provider and a customer at electronic devices 702, 704 and 706 during a service scheduling process.

In some exemplary aspects, server 710 can be a single computing device such as a computer server. In other embodiments, server 710 can represent more than one computing device working together to perform the actions of a server computer (e.g., cloud computing). The server 710 may host the web server communicably coupled to the browser at the client device (e.g., electronic devices 702, 704 or 706) via network 708. In one example, the server 710 may host a client application for scheduling a customer-initiated service or a service-provider-initiated service between a service provider and a customer during a service scheduling process. Server 710 may further be in communication with one or more remote servers 720 either through the network 708 or through another network or communication means.

The one or more remote servers 720 may perform various functionalities and/or storage capabilities described herein with regard to the server 710, either alone or in combination with server 710. Each of the one or more remote servers 720 may host various services. For example, servers 720 may host services providing information regarding one or more suggested locations such as web pages or websites associated with the suggested locations, services for determining the location of one or more users or establishments, search engines for identifying results for a user query, one or more user review or query services, or one or more other services providing information regarding one or more establishments, customers and/or reviews or feedback regarding the establishments.

Each of the one or more remote servers 720 can be a single computing device such as a computer server or can represent more than one computing device working together to perform the actions of a server computer (e.g., cloud computing). In one embodiment server 710 and one or more remote servers 720 may be implemented as a single server or a cluster of servers. In one example, server 710 and one or more remote servers 720 may communicate through the user agent at the client device (e.g., electronic devices 702, 704 or 706) via network 708.

Users may interact with the system hosted by server 710, and/or one or more services hosted by remote servers 720, through a client application installed at the electronic devices 702, 704, and 706. Alternatively, the user may interact with the system through a web-based browser application at the electronic devices 702, 704, and 706. Communication among client devices 702, 704, 706 and the system, and/or one or more services, may be facilitated through a network (e.g., network 708).

Communication among the client devices 702, 704, 706, server 710 and/or one or more remote servers 720 may be facilitated through various communication protocols. In some aspects, client devices 702, 704, 706, server 710 and/or one or more remote servers 720 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA); Personal Digital Cellular (PDC); Wideband Code Division Multiple Access (WCDMA); CDMA2000; or General Packet Radio System (GPRS), among others. For example, the communication may occur through a radio-frequency transceiver (not shown). In addition, short-range communication may occur, including via the use of a Bluetooth-enabled device, Wi-Fi®, or another such transceiver.

Network 708 can include, for example, any one or more of a personal area network (PAN), a local area network (LAN), a campus area network (CAN), a metropolitan area network (MAN), a wide area network (WAN), a broadband network (BBN), the Internet, and the like. Further, network 708 can include, but is not limited to, any one or more of the following network topologies, including a bus network, a star network, a ring network, a mesh network, a star-bus network, a tree or hierarchical network, and the like.

Those skilled in the art should be aware that in one or more of the above examples, the functions described in the present invention can be implemented by hardware, software, firmware, or any combination thereof.

When implemented by software, these functions may be stored in a computer-readable medium, or transmitted as one or more instructions or as one or more pieces of code in the computer-readable medium.

The specific implementation manners described above further describe the objectives, technical solutions, and beneficial effects of the present invention in further detail. It should be understood that the above are only specific implementation manners of the present invention and are not intended to limit the protection scope of the present invention. Any modification, equivalent replacement, improvement, and the like made on the basis of the technical solution of the present invention shall be included in the protection scope of the present invention.

What is claimed is:

1. A computer-executed method for providing secure identity information of a user to a service provider, the method comprising:
   scanning, by a terminal device associated with the user, a graphic code associated with the service provider to obtain coded information included in the graphic code;
   querying, via a first communication link, a registration platform based on the coded information to obtain an identifier of the service provider, an encryption key associated with the service provider, and a user-identity-information requirement associated with the service provider;
   obtaining identity information of the user;
   determining, based on the user-identity-information requirement associated with the service provider, a verification source and a verification mode;
   submitting, via a second communication link, the obtained identity information of the user along with the determined verification mode to the determined verification source to allow the verification source to query a trusted database to obtain verified identity information of the user according to the verification mode;
   receiving, via the second communication link, the verified identity information of the user from the verification source;
   generating secure identity information for the user by encrypting, using the encryption key, at least the verified identity information of the user, wherein the secure identity information comprises the identifier of the service provider; and
   sending, via the first communication link, the secure identity information to the registration platform, thereby allowing the registration platform to forward, via a third communication link, the encrypted verified identity information of the user to the service provider.

2. The method according to claim 1, wherein the graphic code is generated by the registration platform for the service provider in advance.

3. The method according to claim 1, wherein obtaining the identity information of the user comprises one or more of:
   collecting face information using a camera associated with the terminal device;
   reading identity card information using a near-field communication (NFC) reader associated with the terminal device; and
   receiving input information from the user.

4. The method according to claim 1, wherein determining the required verification mode comprises:
   in response to determining that the obtained identity information of the user meets the user-identity-information requirement, determining that the required verification mode is an authentication mode, in which the verification source is configured to return a notification indicating whether the identity information of the user is verified.

5. The method according to claim 1, wherein determining the required verification mode comprises:
   in response to determining that the obtained identity information of the user partially meets the user-identity-information requirement, determining that the required verification mode is an information mode, in which the verification source is configured to return a notification indicating whether the identity information of the user is verified and supplementary identity information of the user determined based on the verified identity information of the user.

6. The method according to claim 5, wherein generating the secure identity information for the user further comprises encrypting, using the encryption key, the verified identity information of the user and the supplementary identity information of the user.

7. The method according to claim 1: wherein determining the verification source comprises determining that the verification source comprises a first verification source and a second verification source; and
   wherein the method further comprises:
   sending a first part of the identity information of the user to the first verification source and sending a second part of the identity information of the user to the second verification source;
   receiving a first verification result from the first verification source, and receiving a second verification result from the second verification source; and
   combining the first verification result and the second verification result to obtain a combined verification result.

8. A computer system, comprising:
   a processor;
   a storage device coupled to the processor and storing instructions, which when executed by the processor cause the processor to perform a method for providing secure identity information of a user to a service provider, the method comprising:
   scanning a graphic code associated with the service provider to obtain coded information included in the graphic code;
   querying, via a first communication link, a registration platform based on the coded information to obtain an identifier of the service provider, an encryption key associated with the service provider, and a user-identity-information requirement associated with the service provider;
   obtaining identity information of the user;
   determining, based on the user-identity-information requirement associated with the service provider, a verification source and a verification mode;

submitting, via a second communication link, the obtained identity information of the user along with the determined verification mode to the determined verification source to allow the verification source to query a trusted database to obtain verified identity information of the user according to the verification mode;

receiving, via the second communication link, the verified identity information of the user from the verification source user;

generating secure identity information for the user by encrypting, using the encryption key, at least the verified identity information of the user; wherein the secure identity information comprises the identifier of the service provider; and sending, via the first communication link, the secure identity information to the registration platform, thereby allowing the registration platform to forward, via a third communication link, the encrypted verified identity information of the user to the service provider.

9. The computer system according to claim 8, wherein the graphic code is generated by the registration platform for the service provider in advance.

10. The computer system according to claim 8, wherein obtaining the identity information of the user comprises one or more of:
collecting face information using a camera associated with the computer system;
reading identity card information using a near-field communication (NFC) reader associated with the computer system; and
receiving input information from the user.

11. The computer system according to claim 8, wherein determining the required verification mode comprises:
in response to determining that the obtained identity information of the user meets the user-identity-information requirement, determining that the required verification mode is an authentication mode, in which the verification source is configured to return a notification indicating whether the identity information of the user is verified.

12. The computer system according to claim 8, wherein determining the required verification mode comprises:
in response to determining that the obtained identity information of the user partially meets the user-identity-information requirement, determining that the required verification mode is an information mode, in which the verification source is configured to return a notification indicating whether the identity information of the user is verified and supplementary identity information of the user determined based on the verified identity information of the user.

13. The computer system according to claim 12, wherein generating the secure identity information for the user further comprises encrypting, using the encryption key, the verified identity information of the user and the supplementary identity information of the user.

14. The computer system according to claim 8:
wherein determining the verification source comprises determining that the verification source comprises a first verification source and a second verification source; and
wherein the method performed by the processor further comprises:
sending a first part of the identity information of the user to the first verification source and sending a second part of the identity information of the user to the second verification source;
receiving a first verification result from the first verification source, and receiving a second verification result, from the second verification source; and
combining the first verification result and the second verification result to obtain a combined verification result.

15. A computer-executed method for obtaining secure identity information of a user, the method comprising:
receiving, by a registration platform from an application running on a terminal device of the user, a query request comprising coded information, wherein the coded information is obtained by scanning, via the terminal device, a graphic code generated by the registration platform in advance for a service provider, and wherein the query request comprises a field indicating whether a server of the application and the registration platform reside in a same physical entity;
determining registration information of the service provider based on the coded information, wherein the registration information comprises at least an encryption key associated with the service provider and a user-identity-information requirement associated with the service provider;
sending the determined registration information of the service provider and an identifier of the service provider to the application to allow the application to determine a verification source and a verification mode based at least on the registration information;
receiving, by the registration platform from the application, the secure identity information of the used, wherein the secure identity information comprises the identifier of the service provider and encrypted information, wherein the encrypted information is obtained by encrypting verified identity information of the user using the encryption key, and wherein the verified identity information the verification mode; and
sending the encrypted information to the service provider based on the identifier of the service provider.

16. The method according to claim 15, further comprising:
receiving the registration information from the service provider; and
generating the graphic code for the service provider based on the registration information.

17. The method according to claim 16, further comprising generating a service index for the registration information; and
storing, by the registration platform, the service index and the registration information associatively.

18. The method according to claim 15, wherein the registration information further comprises routing information of the service provider; and wherein sending the encrypted information to the service provider comprises:
extracting the identifier of the service provider and the encrypted information respectively from the secure identity information;
determining the routing information of the service provider based on the identifier of the service provider; and
sending the encrypted information to a terminal device corresponding to the service provider based on the routing information.

19. The method according to claim 15, wherein:
if the server of the application and the registration platform reside in a same physical entity,
sending the query result to the application comprises providing an application logic of the application with the query result locally; and receiving the secure identity information of the user from the application comprises obtaining the secure identity information locally from the application logic of the application.

\* \* \* \* \*

UNITED STATES PATENT AND TRADEMARK OFFICE
CERTIFICATE OF CORRECTION

| | |
|---|---|
| PATENT NO. | : 11,170,091 B2 |
| APPLICATION NO. | : 17/158658 |
| DATED | : November 9, 2021 |
| INVENTOR(S) | : Gu et al. |

It is certified that error appears in the above-identified patent and that said Letters Patent is hereby corrected as shown below:

In the Claims

Claim 08, Column 25, Line 09 "user" should be removed
Claim 15, Column 26, Line 30 "used" should read "user"

Signed and Sealed this
Third Day of May, 2022

Katherine Kelly Vidal
*Director of the United States Patent and Trademark Office*